United States Patent [19]
Grice et al.

[11] Patent Number: 5,251,857
[45] Date of Patent: Oct. 12, 1993

[54] SUSPENDABLE CONDUIT BRACKET SYSTEM

[76] Inventors: Gordon J. Grice, One Parker Pl., Janesville, Wis. 53545; Harry Travis, 1011 Elaine Dr., Beloit, Wis. 53511

[21] Appl. No.: 907,513

[22] Filed: Jul. 1, 1992

Related U.S. Application Data

[63] Continuation-in-part of Ser. No. 665,549, Mar. 7, 1991, Pat. No. 5,133,523, which is a continuation-in-part of Ser. No. 480,912, Feb. 16, 1990, Pat. No. 5,044,583, which is a continuation-in-part of Ser. No. 354,860, May 22, 1989, Pat. No. 4,911,387, which is a continuation-in-part of Ser. No. 211,967, Jun. 27, 1988, Pat. No. 4,901,957.

[51] Int. Cl.⁵ .............................................. F16L 3/08
[52] U.S. Cl. ........................................ 248/62; 248/74.2; 248/343
[58] Field of Search ............. 248/74.1, 74.2, 74.4, 248/73, 62, 60, 58, 65, 74.3, 63, 343, 49, 316.6; 24/459, 19; 138/107; 239/201

[56] References Cited

U.S. PATENT DOCUMENTS

| | | | |
|---|---|---|---|
| 4,291,855 | 9/1981 | Schenkel et al. | 248/74.1 |
| 4,762,296 | 8/1988 | Kraus et al. | 248/74.2 |
| 4,802,646 | 2/1989 | Cattani | 248/74.2 X |
| 4,901,957 | 2/1990 | Daigle et al. | 248/62 |
| 4,973,014 | 11/1990 | Daigle et al. | 248/62 |
| 5,044,583 | 9/1991 | Diagle et al. | 248/62 |
| 5,118,215 | 6/1992 | Freier | 248/74.2 X |
| 5,133,523 | 7/1992 | Daigle et al. | 248/62 |

FOREIGN PATENT DOCUMENTS 2183287 6/1987 United Kingdom .............. 248/74.1

Primary Examiner—Ramon O. Ramirez
Attorney, Agent, or Firm—Melvin K. Silverman

[57] ABSTRACT

A suspendable conduit bracket system includes a back bracket element defining, in transverse cross-section, an inner semicircle and an outer semicircle of greater radius than the inner semicircle, such semi-circles mutually integrally secured by ribbing elements, the inner semi-circle comprising a nesting element proportioned to the cross-sectional geometry of a conduit to be suspended. The bracket system further includes a radial portion protruding externally from the two semi-circles of the back element, passing through both of the semi-circles, and having an element for selectable lockable engagement with a solid rectangular channel, a threaded radial channel extending through substantially the entire radial length of such channel, and proximally to the intersection of the radial portion with the back element, a rigid insert having a deformable aperture is secured transversely to the threaded channel. The aperture is positioned at an axial center of the threaded is proportioned for snap-fittable receipt of a threaded hanger rod advancable through the channel and through the deformable aperture of the rigid insert.

14 Claims, 2 Drawing Sheets

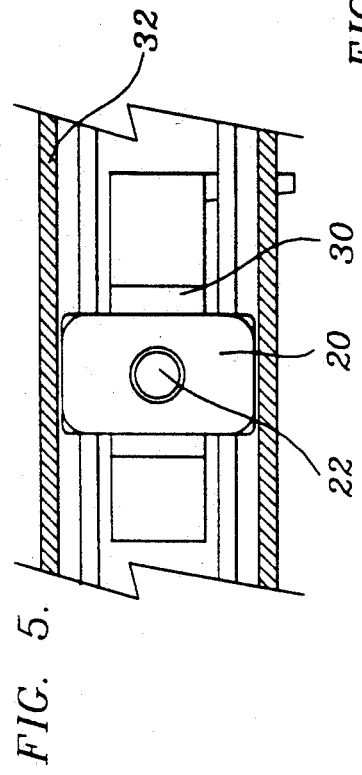
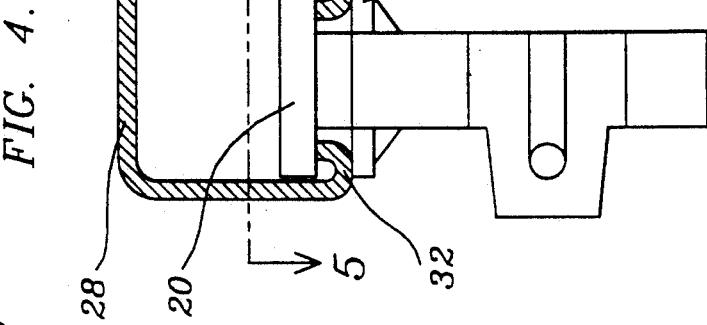
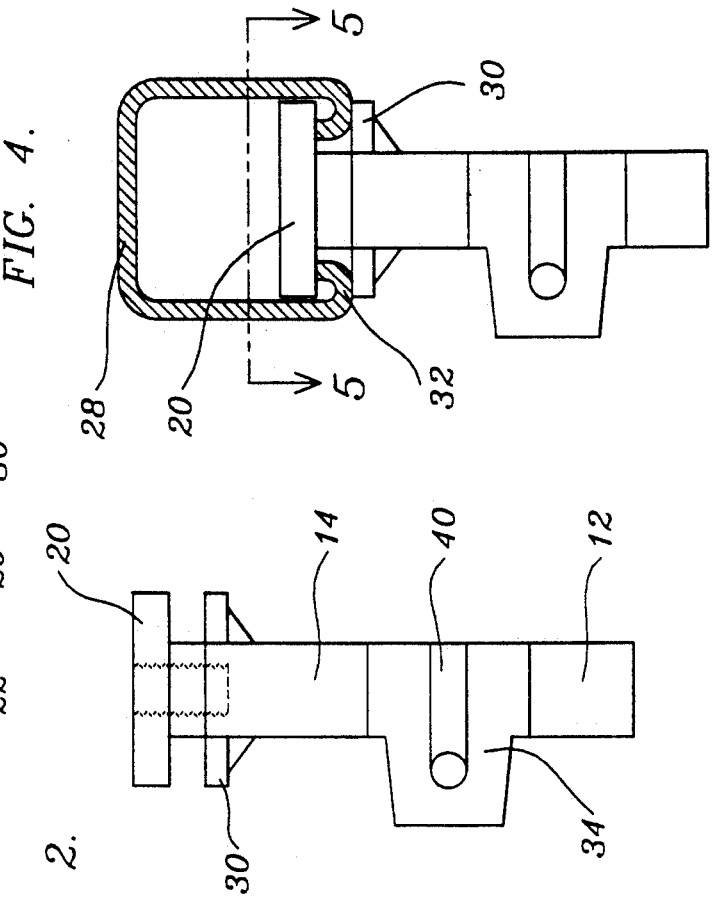
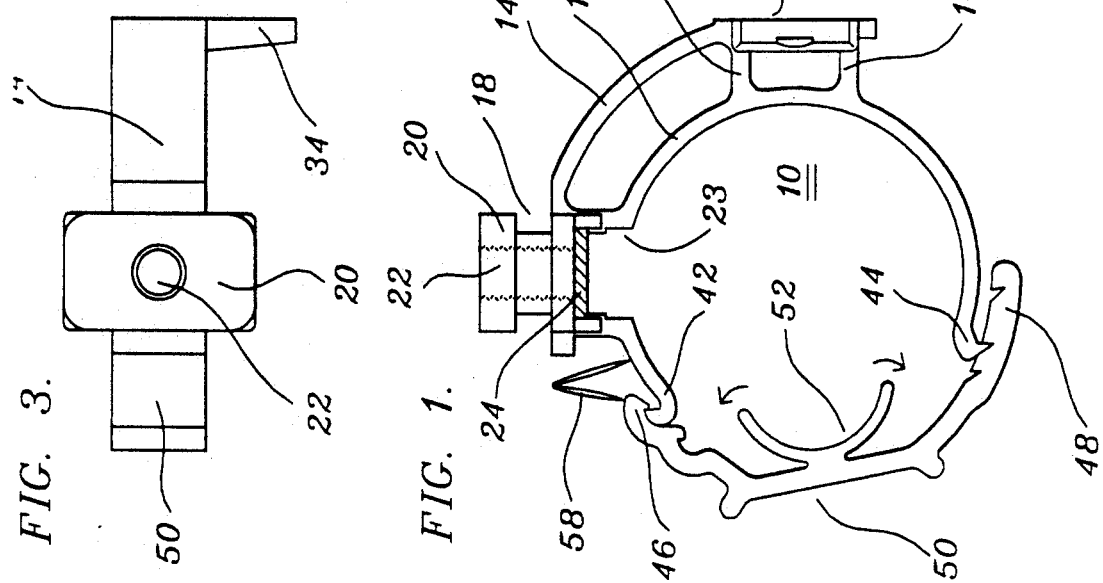
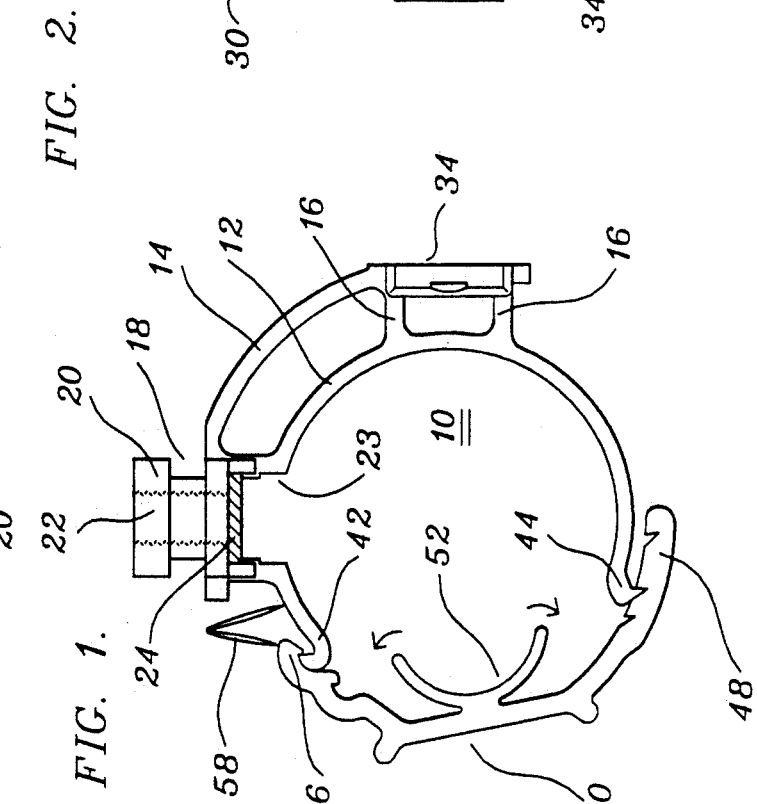

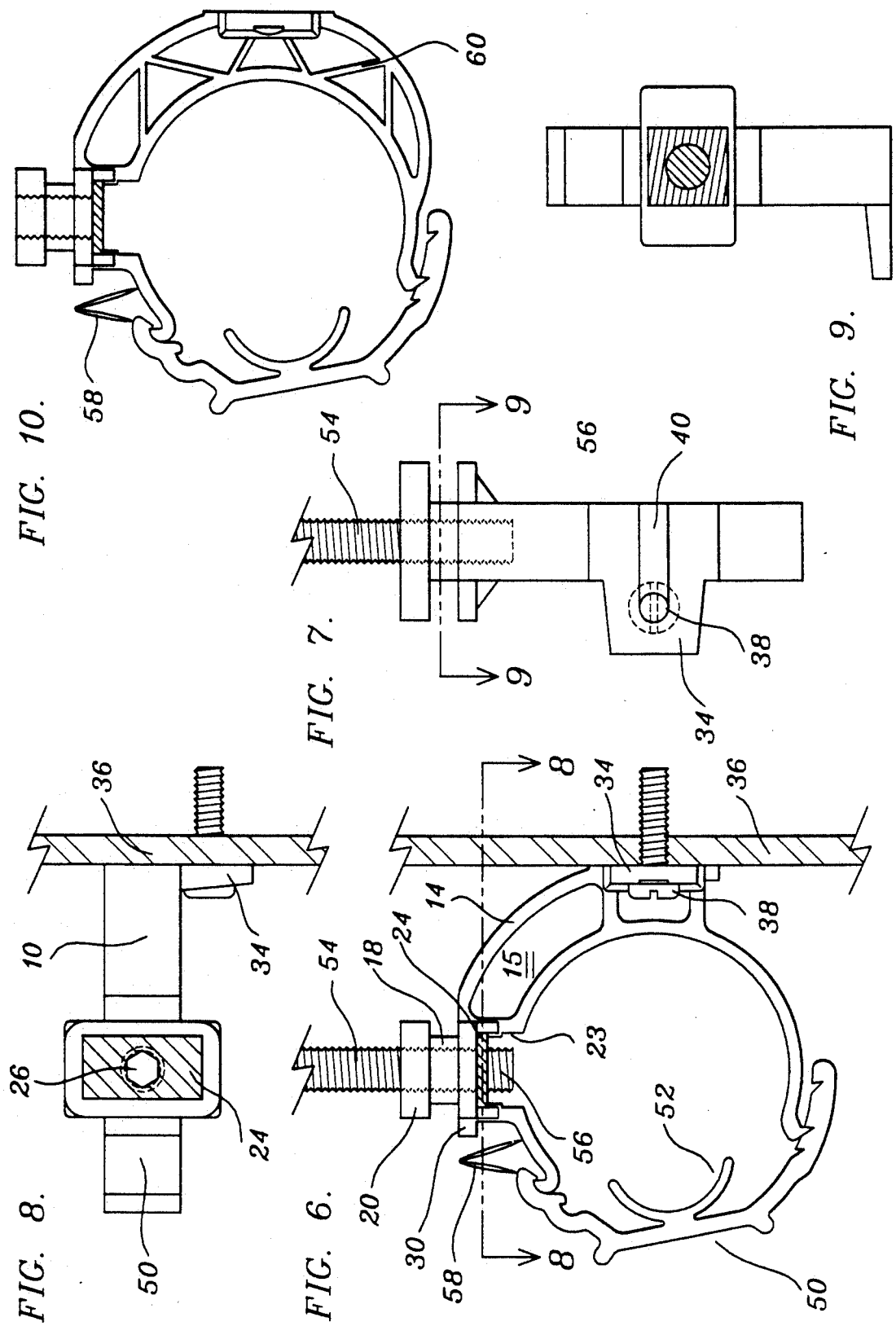

SUSPENDABLE CONDUIT BRACKET SYSTEM

REFERENCE TO RELATED APPLICATION

This case is a continuation-in-part of application Ser. No. 07/665,549, filed Mar. 7, 1991, now U.S. Pat. No. 5,133,523, which is a continuation-in-part of application Ser. No. 07/480,912, filed Feb. 16, 1990, now U.S. Pat. No. 5,044,583. That application is a continuation-in-part of application Ser. No. 07/354,860, filed May 22, 1989, now U.S. Pat. No. 4,911,387, which is itself a continuation-in-part of application Ser. No. 07/211,967, filed Jun. 27, 1988, now U.S. Pat. No. 4,901,957.

BACKGROUND OF THE INVENTION

The present invention relates to a bracket and lock system for the suspended securement, typically at or near ceiling level, of selective conduits including, without limitation, electrical and fluid conduits.

In the prior art, the securement of pipes in residential, commercial and industrial environments has been a tedious and costly undertaking. Further, the process of servicing such conduits, once installed, has proven to be difficult, expensive and time-consuming.

The present invention represents a generalization of the above referenced commonly owned application Ser. No. 07/665,549, entitled Suspendable Conduit Bracket Lock System for use, in addition to the so-called UNI-STRUT area, to applications in combination with a so-called threaded rod, such use optionally including use with a so-called Tinnerman snap-nut. The improvement of the instant invention also includes an improvement of the subject matter thereof which provides for flexibility of use with conduits of various diameters, provides means for absorbing vibration and impact upon the bracket structure, and affords improved means for collateral connection of the bracket to a sidewall in addition to the above mentioned securement to a UNI-STRUT hanger and threaded rod.

There exists in the prior art various types of brackets having utility in the securement of one or another type of conduit, as well as brackets employing other, different conduit securement strategy. Such systems are represented by U.S. Pat. No. 4,291,855 (1981) to Schenkel, entitled Pipe Clamp; U.S. Pat. No. 4,252,289 (1980) to Herb, entitled Two Part Type Clip, U.S. Pat. No. 4,079,786 (1978) to Moling, entitled Fire Extinguishing System, and U.S. Pat. No. 4,564,163 (1986) to Barnett, entitled Retaining Clip. The foreign art, as best known to the inventors, is represented by United Kingdom Patent No. 2,183,287 (1987) to Klein.

None of the above, nor other prior art known to the inventor, discloses a modular suspendable conduit bracket securement system having multiple compatability for use with a UNI-STRUT hanger and a threaded rod-type hanger for optional use thereof together with a Tinnerman snap-nut.

The UNI-STRUT is a multi-purpose suspension system which takes the form of a suspended hollow rod having a rectangular cross-section having top, left and right sides thereof and having, as a bottom surface thereof, a resilient, typically polymeric, elements secured within edges of such left and right sides. The concept of the UNI-STRUT hanger is that brackets, of various types, can be secured at various elevations and angulations thereto, after the UNI-STRUT hanger itself has been suspended at a desired height and axis within or upon a particular structure. Also, the resilient element may be selectably slidable within the left and right securing edges (trucks) thereof to provide for movability of any bracket secured thereto relative to the axis of the UNI-STRUT.

Once the appropriate bracket is secured to the UNI-STRUT, conduits of varying types may be nested within such bracket structure for selectable coupling and decoupling thereto.

Prior art strategies that have been directed to the provision of a system capable of addressing all the above set forth variables that exist are particularly represented by the so-called two-part clips which are reflected in said U.S. Pat. Nos. 4,252,289 and 4,291,855. Two part systems do not afford a practical means of directing coupling to an UNI-STRUT channel and, with respect to use in conjunction with a threaded rod hanger do not afford the same ease of use, economy, and protection to the conduit as in the system set forth herein, or compatibility with the Tinnerman snap-nut. More particularly, the instant system is formed completely of components that may be selectably coupled, as by snap-and twist-fitting, to form common connections between all such components, thusly eliminating the need for much of the laborious aspects associated with installation of conduit piping in the prior art. It is, accordingly, as a response to such limitations in the art that the present invention is directed.

SUMMARY OF THE INVENTION

The invention constitutes a suspendable conduit bracket system which includes a back bracket element defining, in transverse cross-section, an inner semicircle and an outer semicircle of greater radius than said inner semicircle, said semicircles mutually integrally secured by ribbing means, said inner semicircle comprising nesting means proportioned to the cross-sectional geometry of a conduit to be suspended. The inventive suspendable bracket system further includes a radial portion protruding externally from said semicircles of said back element, passing through both of said semicircles, and having (1) means for selectable lockable engagement with a solid rectangular channel, (2) a threaded radial channel extending through substantially the entire radial length of such channel, and (3) proximally to the intersection of said radial portion with said back element, a rigid insert having a deformable aperture therein. Said insert is secured transversely to said threaded channel and said aperture is positioned at an axial center of said threaded channel which, further, is proportioned for snap-fittable receipt of a threaded hanger rod advancable through said channel and through said deformable aperture of said rigid insert.

The system may be optionally provided with a front element proportioned, in transverse cross-section, for complemental engagement with said back element which front element, on the side thereof facing the inside diameter of said back element, may be provided with a deformable resilient gripping element depending internally from said front element and proportioned to engage conduits of lesser radius than the radius of said inner semicircle of said back element.

It is accordingly an object of the present invention to provide a suspendable conduit securement bracket system, for use with UNI-STRUT channels and threaded hanger rods.

It is another object of the invention to provide a system of the above type compatible for use with a Tinnerman and other snap-nuts.

It is a further object of the invention to provide a conduit securement bracket of the above type that may be securable to one or more surfaces through the use of threaded studs.

It is a yet further object of the invention to provide an improved conduit bracket and suspension system having particular utility and convenience in the suspension of electrical and fluid conduits along axes that may or may not be co-linear or co-parallel with the axis of the suspending hanger.

The above and yet other objects and advantages of the invention will become apparent from the hereinafter set forth Detailed Description of the Invention, The Drawings, and Claims appended herewith.

BRIEF DESCRIPTION OF THE DRAWINGS

FIG. 1 is a front plan view of the bracket securement system.

FIG. 2 is a right plan view thereof.

FIG. 3 is a top plan view of the bracket securement system.

FIG. 4 is a side view, similar to the view of FIG. 2, showing the system in combination with a UNI-STRUT channel.

FIG. 5 is a top cross-sectional view taken along Line 5—5 of FIG. 4.

FIG. 6 is a front cross-sectional view showing the bracket system in use with a threaded hanger rod, a Tinnerman snap-nut and a side mounting means.

FIG. 7 is a right side view of the system of FIG. 6.

FIG. 8 is a top cross-sectional view of the system of FIG. 6, taken thru Line 8—8 thereof, prior to intersection of a hanger rod.

FIG. 9 is a top cross-sectional view taken through Line 9—9 of FIG. 6.

FIG. 10 is a front view of a further embodiment of the invention.

DETAILED DESCRIPTION OF THE INVENTION

With reference to the views of FIGS. 1 thru 3, the inventive suspendable conduit bracket system may be seen to include a back bracket element 10 defining, in transverse cross-section, an inner semicircular element 12 and an outer semicircular element 14 of greater radius than said inner semicircle, but having a lesser polar extent. Said outer element may, in given applications, comprise a polygonal surface.

Said semicircular elements are mutually integrally secured by ribbing means 16 which afford a degree of resilience and, thereby, shock retardance between the inner and outer semicircular elements 12 and 14. As is more fully set forth with respect to the embodiment of FIG. 10 described below, various types of ribbing or trussing as well as resilient fillings, may be placed in the region 15 between the inner and outer semicircular elements 12 and 14. Also, it is to be appreciated that outer semicircular element 14 may, if desired, be extended downwardly beneath said ribbing means 16 so that it is substantially symmetric about a horizontal axis of the system.

Said inner semicircular element 12 comprises a resilient nesting means proportioned to grip the cross-sectional geometry of a conduit to be suspended.

It may be seen that the inventive system further includes a radial portion 18 which protrudes externally from said inner and outer semicircular elements. Said radial portion 18 includes an interlock element 20 which comprises means for selectable lockable engagement with any element having a hollow solid rectangular channel of the type employed in so-called UNI-STRUT hangers. Said radial portion 18 further includes a threaded radial channel 22 which extends substantially through the entire radial length of the radial portion 18.

Provided proximally to the intersection of said radial portion 18 and connecting segment 23 between said inner and outer semicircular elements 12 and 14, is a rigid insert 24 having therein a deformable aperture 26 (see FIGS. 6 thru 8). Said insert 24 is positioned such that the aperture 26 therein is at the axial center of said threaded channel 22.

As may be noted from the side view of FIG. 4, the inventive system, when installed within a UNI-STRUT channel 28, is held thereto by the co-action of said interlock element 20 and a lower locking element 30 relative to so-called tracks 32 of the UNI-STRUT channel 28. See FIG. 5. As may be noted, element 20 is inserted into the UNI-STRUT channel by initialling positioning the major axis of element 20 co-linearly with the major axis defined by the UNI-STRUT channel. After element 20 has been so positioned it is then rotated by ninety degrees to thereby achieve the position shown in FIG. 5 to form with the resultant firm interlock of the radial portion 18 within tracks 32 of the UNI-STRUT channel shown in FIG. 4.

With further reference of FIGS. 6 thru 9, the conduit securement system is seen to include means 34 for mounting of the bracket to a sidewall 36. As may be noted said mounting means is integrally external of said outer semicircular element 14, is directed at right angles to the principal plane of the system and is co-parallel with the major axis of element 20 described above. Such sidewall mounting means may be readily employed together with screw means 38 to effect securement of means 34 to sidewall 36. Slot 40 is preferably provided within securement means 34 to provide for ease of positioning of the system relative to wall 36.

With further reference to FIGS. 1 and 6 it is noted that said back bracket element 10 further includes, along opposite transverse edges thereof, complemental coupling means 42 and 44 which are proportioned for complemental engagement with multiple complemental coupling means 46 and 48 of a front element 50 which also includes an internal flexible grip 52, the function of which is to self-adjust to the internal diameter of whatever pipe or conduit is secured/nested within back bracket element 10. Accordingly, it is to be appreciated that flexible grip 52 will yield in the direction indicated by the curved arrows at the ends thereof to accommodate conduits having diameters substantially less than the inside diameter of inner semicircular element 12. As such, conduits having radii substantially less than the radii of the semicircular element 12 can be secured through the use of the instant system and, as well, even those conduits having a radius near to that of inner semicircular element 12 will be more effectively secured and stabilized through the function of flexible grip 52.

Said complemental coupling means 42, 44, 46 and 48 permit considerable adjustability of the system to accommodate conduits of greater and lesser diameter. Accordingly, in addition to the above described function of flexible grip 52, a yet further range in accommodation of pipe diameters is afforded through the use of such a group of complementary coupling means.

It is further noted that a flexible hinge 58 (see FIGS. 1 and 6) may be provided as a means of joining the front and back elements of the system. Where the flexible hinge 58 is used the possibility of front element 50 dropping onto the floor and, thereby, complicating installation is minimized. Further, where flexible hinge 58 is employed, considerable time is saved in installation. Further, the servicing of conduits, already installed, is considerably simplified in that one need only to decouple elements 42 and 46 to gain access to the secured conduit, which, by front and back elements 10 and 50, are integrally held.

In the views of FIGS. 6 thru 9 the inventive bracket securement system is shown in combination with a threaded hanger rod 54. Radial channel 22 is proportioned for threaded receipt of such threaded rods and studs. As may be further noted, at the lowermost extent of the rod 54, and 56 thereof passes through aperture 26 of insert 24 to the position more particularly shown in the views of FIGS. 6 and 7. Rigid insert 24 is, in the industry, particularly known as a snap-nut and constitutes a well-known recognized means of securement of threaded rods and studs in mechanical structures. One applicable type of snap-nut is a Tinnerman nut. As such, the instant inventive system incorporates therein a well-known locking means.

In the view of FIG. 10 is shown a further embodiment of the present invention in which said ribbing means 16 have taken the form of a truss 60. It is to be appreciated that such resilient means or truss may take numerous forms and, as above noted, outer semicircular element 14 may extend downward to the region of flexible hinge 58 in the manner shown in FIG. 10.

It is to be appreciated that there has been shown and described a suspendable conduit bracket system having application in and with a variety of securement strategies and usable with conduits having many different diameters. It is, as well, to be understood that structures other than conduits, that is, structures not necessarily having a circular cross-section, may readily be suspended within the scope of the bracket system as above set forth.

Accordingly, while there has been shown and described the preferred embodiment of the present invention, it is to be appreciated that the invention may be embodied otherwise than is herein specifically shown and described and that, within said embodiment, certain changes may be made within the detail and construction thereof without departing from the underlying idea or principles of the present invention within the scope of the claims appended herewith.

Having thus described our invention, what we claim as new, useful and non-obvious and, accordingly, secure by Letter Patent of the United States is:

1. A suspendable conduit bracket system, comprising:
   (a) a back bracket element defining, in transverse cross-section, an inner semicircle and an outer semicircle of greater radius than said inner semicircle, said inner and outer semicircles mutually integrally secured by ribbing means, said inner semicircle comprising nesting means proportioned to the cross-sectional geometry of a conduit to be suspended; and
   (b) a radial portion protruding integrally externally from said semicircles of said back bracket element, passing through at least one of said semicircles and having (i) means for selectable lockable engagement with a hollow solid rectangular channel, (ii) a threaded radial channel extending through substantially the radial length of said radial portion, and (iii) proximal to an intersection of said radial portion with said outer semicircle of said back bracket element, a rigid insert having a deformable aperture therein, said insert secured transversely to said threaded channel, positioned at an axial center of said threaded channel and proportioned for snap-fittable receipt of a threaded rod advanced through said aperture of said insert.

2. The bracket system as recited in claim 1, further comprising:
   means for mounting said bracket to a constructional surface, said mounting means formed integrally externally to said outer semicircle of said back element.

3. The system as recited in claim 2 in which said mounting means includes slot means proportioned to engage a protrusion of a screw element.

4. The bracket system as recited in claim 1, in which said back bracket element further comprises, along opposite transverse edges thereof, complemental coupling means, and in which said brackets system further comprises:
   a front bracket element proportioned, in transverse cross-section, for complemental engagement with said complemental coupling means of said back bracket element.

5. The bracket system as recited in claim 4, said front element further comprises:
   deformable resilient gripping means depending internally from said front element and proportioned to engage conduits of lesser radius than the radius of said inner semicircle of said back bracket element.

6. The bracket system as recited in claim 5, further comprising:
   flexible hinge means in integral communication with one surface of said front element and one surface of said back element in substantially opposing relationship thereto.

7. The bracket system as recited in claim 2, in which said back element further comprises, along opposite transverse edges thereof, complemental coupling means, and in which said bracket system further comprises:
   a front element proportioned, in transverse cross-section, for complemental engagement with said complemental coupling means of said back element.

8. The bracket system as recited in claim 7, said front element further comprising:
   deformable resilient gripping means depending internally from said front element and proportioned to engage conduits of lesser radius than the radius of said inner semicircle of said back element.

9. The bracket system as recited in claim 8, further comprising:
   flexible hinge means in integral communication with one surface of said front element and one surface of said back element in substantially opposing relationship thereto.

10. The bracket system as recited in claim 9, in which said mounting means includes slot means proportioned to engage a protrusion of a screw element.

11. The bracket system as recited in claim 4 in which said ribbing means comprises:

a resilient truss web.

12. The system as recited in claim 4 in which said rigid insert of said radial portion comprises:
a snap-nut.

13. The system as recited in claim 4 in which said outer semicircle of said back element comprises a polygon.

14. The system as recited in claim 2 further comprising:
flexible hinge means in integral communication with one surface of said front element and one surface of said back element in substantially opposing relationship thereto.

* * * * *